July 22, 1958 K. B. ANNERHED 2,844,359
MEANS FOR COOLING OR HEATING OF MATERIALS
Filed May 1, 1956 2 Sheets-Sheet 1

INVENTOR
Karl Bertil Annerhed,
BY Pierce, Scheffler & Parker
his ATTORNEYS

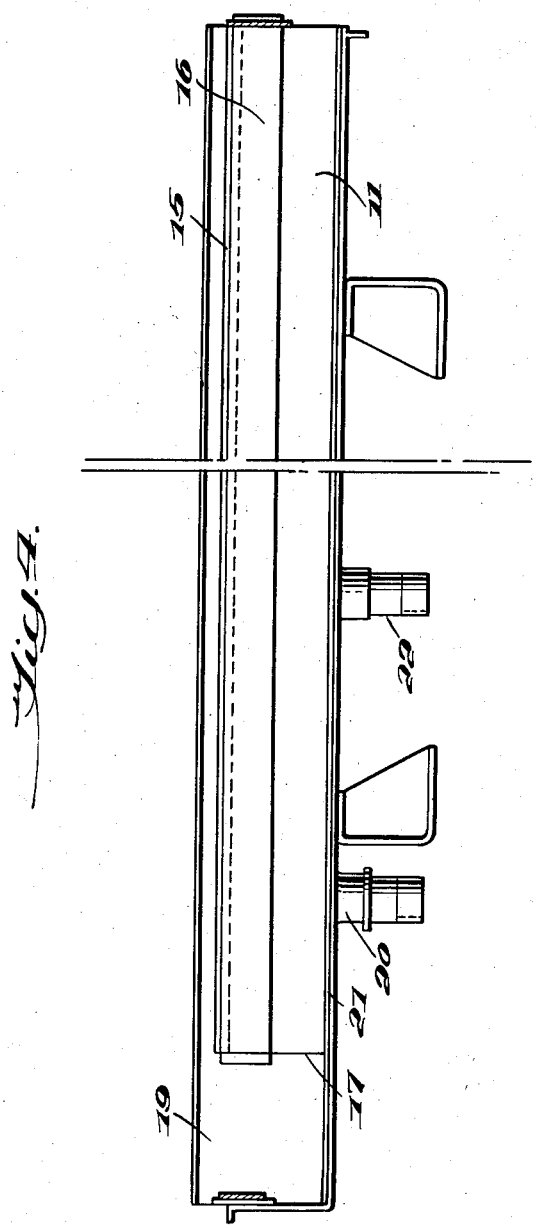

United States Patent Office 2,844,359
Patented July 22, 1958

2,844,359

MEANS FOR COOLING OR HEATING OF MATERIALS

Karl Bertil Annerhed, Sandviken, Sweden, assignor to Sandvikens Jernverks Aktiebolag, Sandviken, Sweden, a corporation of Sweden Application May 1, 1956, Serial No. 581,923

Claims priority, application Sweden May 6, 1955

5 Claims. (Cl. 257—23)

This invention relates to the provision of means for cooling or heating of materials on a conveyor band.

A constructively advantageous solution of such problem has been proposed according to which, among other things, transported materials are to be carried by a thin, endless, heat-conducting conveyor belt, preferably of metal, under which conveyor belt—at the part carrying the material—there is arranged a container or trough containing cooling, respectively, heating, liquid which latter is fed to the container under positive pressure. The under side of the conveyor belt is arranged to float in contact with the liquid, and the container is provided with longitudinal, horizontal supports or bars for the edges of the conveyor belt, so arranged as to permit a sidewise discharge of liquid between the mentioned supports and the belt under impression of the mentioned positive pressure. Said proposed device has proved itself to be operable when lightly loaded; however, at heavier transports said device has proved to have limitations. Among other things, at heavier load, the supports—and especially the supports at the sides perpendicular with the longitudinal direction of the belt—have been subjected to rapid wear, and thereupon have formed sharp edges which have worn against and sometimes hooked to the belt. Further, a conveyor belt is—as is well known—often not quite even, and therefore the height of the liquid column has varied at the passing of the belt with an unequal escape and therewith undesired cooling and other drawbacks have occurred as a consequence.

The present invention is concerned with an improvement of the just mentioned device, to retain its advantages and simultaneously to eliminate the above, and other, drawbacks. It relates to means for cooling or heating of materials carried by a thin, endless conveyor belt, said means comprising a container, tank, trough, or the like, positioned under that part of the conveyor belt which carries the material, said container containing a body of heating, respectively, a cooling, liquid which is fed under positive pressure to the container and with which liquid the under side of the conveyor belt is in contact. The invention is characterized in that the container there are provided mechanical supporting means for the belt and also supporting devices at which are fastened barrier strips of resilient material, such as rubber, thin steel tongues or the like, directed against the under side of the belt, and arranged to permit a sidewise discharge of heat-transfer liquid between the barrier strips and the belt under impression of the positive pressure of the liquid. Through this expedient the means may be used also for heavy material loads without there arising sharply worn metal edges at the overflow discharge which would be damaging to the conveyor belt. The presence of the mechanical supporting means, for instance support pulleys, does not bring about any decrease in the cooling, respectively heating, action of the liquid. Through use of the barrier strips, preferably made of rubber, there is obtained a uniform thickness of the liquid film at the overflow discharge, notwithstanding that the belt may be not quite plane, e. g., in wave-form or otherwise curved. The uniform thickness of liquid film provides uniform liquid discharge and uniform cooling (respectively, heating) action, and eliminates risk of damage at the overflow discharge.

In the appended drawings are illustrated alternative operable embodiments of the principles of the invention.

Fig. 4 shows the same device seen from the side and with the support pulleys not shown.

Figure 1:
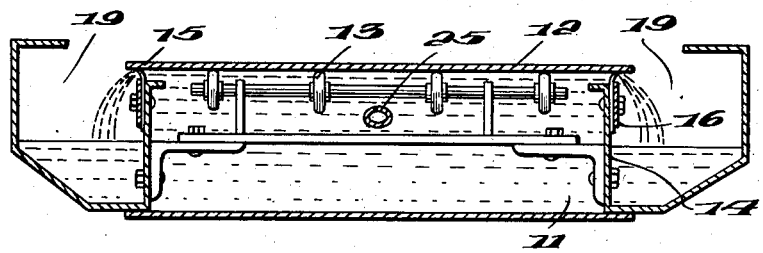
Fig. 1 shows a cross-section of an operable form of the device.
Figure 2:
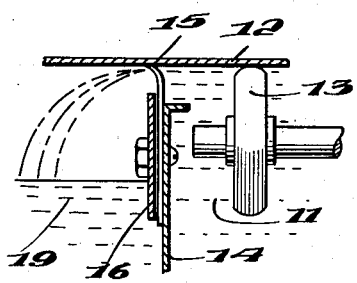
Fig. 2 is an enlarged view of the overflow discharge.
Figure 3:
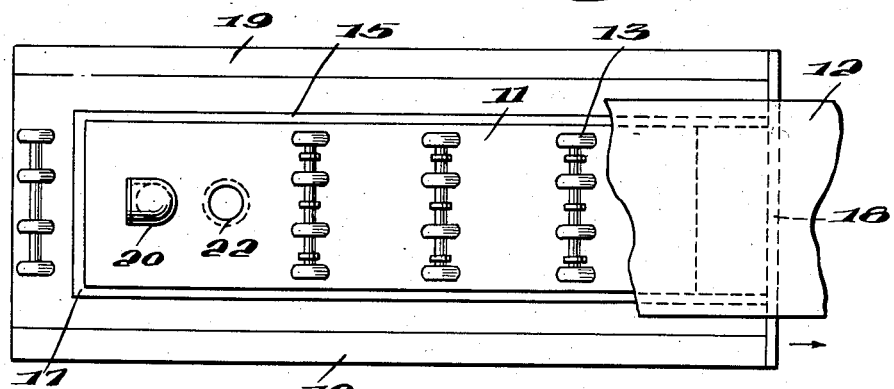
Fig. 3 is a plan view of the device, with some details taken away, and showing another system of liquid feed.

A container (tank) 11 is fed with liquid for cooling or heating purposes, i. e., in the first case with a liquid having a lower, and in the second case with a liquid having a higher, temperature than that of the transported material. A thin, endless conveyor belt 12 transports material—previously fed thereonto—in the direction of the arrow in Fig. 3. This belt is shown in Figs. 1, 2 and 3—partly removed in the last case—and completely removed in Fig. 4. The under side of belt 12 is disposed in contact with the liquid, and is arranged to be carried by mechanical supporting means, e. g., horizontal rails or, as shown, support pulleys 13, which are positioned in the container. In Fig. 3 these pulleys are, for the sake of clearness, only partly shown. Here are to be seen also the support pulleys for supporting the belt prior to to its passage over the tank and between two tanks. The performance of these details may be effected in different ways known in transporting technics. At the side walls 14 of the container 11 are fastened barrier strips 15 of resilient material, e. g., rubber or rubber-like material, thin flexible steel bands or the like (see especially Fig. 2). The same may be fastened for example by means of clamping between the wall 14 and a cross-bar, and such barrier strips are suitably applied also at the ends 17 and 18 of the container, perpendicular with the longitudinal direction of the belt 12. The container may be manufactured in any well-known manner, in accordance with the main purpose that the liquid is to be in contact with the under side of the belt 12. At the side of the container, in the case shown in connection with this, are arranged receiving channels 19 for receiving the outflow of liquid from the overflow discharge at 15 (see especially Fig. 2). The barrier strips 15 may, naturally, be placed also elsewhere than in the tank. The uppermost part of the barrier strip may have any one of several cross-sections in order in every special case to obtain the best possible discharge conditions: for example, the upper border may be formed as a substantially circular solid or hollow bead; or, the upper border may be formed with one or more channels, middle-notches, etc., running in the direction of the overflow discharge. The angle between the uttermost parts of the barrier strips and the belt may have a value between 0 and 90°.

The device operates in the following manner:

Materials which, for example, are to be cooled are transported upon the belt 12 in one direction over the container 11, to which container cooling medium is fed under positive pressure. The materials are cooled by heat transfer from the materials via the belt to the body of cooling liquid within the container, which latter is provided with suitable feed and discharge means for circulating cooling liquid through the same. At 15 there is formed the overflow discharge for the cooling liquid, and the resulting thin water-film normally present between the barrier strips 15 and the belt prevents direct contact between these parts. If this film for any reason should disappear—for example, at an extra great temporary overload—the contact between the belt and the barrier strips will not cause any damage to the former, because of the elasticity of the barrier strips.

From the overflow discharge, at 15, the liquid runs down to the channels 19 and either is returned to container 11 after a cooling step or is discarded. During the cooling the materials are moved over the container, and, in the event more thoroughgoing cooling is required, a plurality of cooling containers, arranged in series, may be used. In certain cases there may be used liquids at different temperatures, and/or different liquids, in the different containers for successive heating/cooling at a rate suitable for the character of the materials. In the case of heating materials, the heat transfer takes place in the contrary direction, but any constructive difference in this case, with regard to a cooling device, is not necessarily to be found. In the transport of materials having a high liquid content, for instance gelatin, the conveyor belt may be associated with border strips adapted to prevent flow of the material off the belt, which border strips may consist of tilted bands, selvages or similar devices, either loose or firmly arranged on, or in association with, the belt.

The position of the barrier strips and, thus the form of the container is, as shown in the simplest case, rectangular, but it is naturally possible to arrange the barrier strips in their longitudinal direction, obliquely, plough-formed, rounded, or the like.

The feed of liquor to the container may in the simplest case take place as shown in Figs. 3 and 4, i. e., by means of a spray tube 20 having a curved end portion, the outflow direction of which in the case shown is parallel with the bottom 21 of the container 11. Feed may also take place by means of a single tube 25 in accordance with Fig. 1. The introduced liquid, however, may also be directed obliquely or directly against the bottom or in some cases partly in upward direction. The purpose of the outflow direction in the mentioned manner is that it is desirable to maintain a turbulent, liquid current in the body of liquid in the container in order to effect a uniform and more effective heating, respectively cooling, and thereby to obtain a saving in the volume of liquid necessary, and to diminish risk of deformation of the strip and unsuitable temperature relations with the materials undergoing treatment. In the case illustrated the spray tube 20 is directed against the end wall 17 in order to obtain suitable current direction, but this direction is, of course, only an example of many operable arrangements within the scope of the invention. The tube 20 is, as illustrated, placed adjacent that part of the container over which the belt first passes, this disposition being chosen in order to obtain uniform heating/cooling. In the case shown there is provided an outlet tube 22 in the bottom of the container, which outlet tube is used when the container is to be emptied.

As liquid, water may be used which may, e. g., at heating, have a temperature of 80–90° C.

Figure 5:
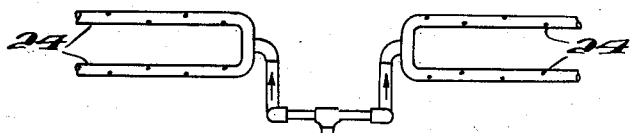
Fig. 5 shows an alternative embodiment of the liquid feed.

In Fig. 5 is shown an alternative embodiment of the liquid feed (only the tube being shown), which in certain cases may be advantageous. Along the container there extend tube branches 24, which are fed with liquid from a common inlet tube 23. The branches are provided with a number of discharge openings in varying directions, e. g., directed downwardly or parallel with the bottom of the container. The same container may be provided with a greater number of such systems. The purpose of the directions of the openings is here, as in the earlier mentioned case, to maintain turbulence in the body or stream of liquid. The openings should not be too small, as in such cases unduly great losses in pressure result and consequently a greater consumption of power for driving the circulation pumps.

The application of the material upon the belt may take place in different ways within known transportation technics. Thus, for this purpose there may be arranged an inclined trough, or an inclined plate or conduit provided with keeping or spraying devices for materials, e. g., barrier strips or the like, secured to such inclined plate.

It is to be understood that the mentioned embodiments for the different details of the invention are merely illustrative of such solutions, which may be made within the scope of the following claims.

I claim:

1. Means for cooling or heating a material which is supported upon a moving, thin endless conveyor belt said means including a container located below that part of the conveyor belt which carries the material and said container containing a body of heat-transfer liquid which liquid is fed to the container under positive pressure and with which body of liquid the underside of the belt is in contact, characterized in that relatively non-deformable mechanical belt-supporting means are provided substantially within the container, and characterized in that the container is associated with at least two support devices to each of which is secured a resilient barrier strip substantially parallel with the side edges of the belt and extending against the under side of the belt forming an upper side border of the container and arranged to permit a sidewise outflow of liquid between the belt and said resilient barrier strip under impression of the positive pressure of the liquid in a substantially continuous and uniform sheet along substantially the whole length of the strip, said relatively non-deformable mechanical support means being positioned beside said strips and support devices, the uppermost parts of the relatively non-deformable mechanical support means being at substantially the same level as the upper borders of the resilient strips in loaded condition.

2. Means according to claim 1, characterized in that the devices for supporting the barrier strips consist of the walls of the container.

3. Means according to claim 1, characterized in that the mechanical support means for the belt consists of a plurality of horizontally spaced support pulleys arranged within said container and at least substantially surrounded by liquid.

4. Means according to claim 1, characterized in that the resilient barrier strip is formed of rubber, and is fastened by means of a clamping member between a side wall of the container and a longitudinal cross-bar.

5. Means according to claim 1, characterized in that the liquid container is provided with an inlet for liquid, said inlet comprising at least one feed tube positioned within that part of the container which is first passed by the conveyor belt, said tube having an outflow direction in relation to the bottom of the container directed toward the bottom of the container at an angle of not more than 90° so as to insure turbulence in said body of heat-transfer liquid.

References Cited in the file of this patent

UNITED STATES PATENTS

| 2,124,233 | Martin | July 19, 1938 |
| 2,274,677 | Eberhart | Mar. 3, 1942 |
| 2,360,100 | Bowen | Oct. 10, 1944 |
| 2,437,492 | Allen | Mar. 9, 1948 |